US005943860A

United States Patent [19]

Kato

[11] Patent Number: 5,943,860
[45] Date of Patent: Aug. 31, 1999

[54] PRESSURE LOSS COMPENSATION DEVICE OF A FLUID PRESSURE CIRCUIT AND CAM ARRANGEMENT INCORPORATING THE SAME

[75] Inventor: Heizaburo Kato, Shizuoka, Japan

[73] Assignee: Sankyo Manufacturing Co., Ltd., Tokyo, Japan

[21] Appl. No.: 08/964,696

[22] Filed: Nov. 6, 1997

[30] Foreign Application Priority Data

Nov. 11, 1996 [JP] Japan .................................... 8-298954

[51] Int. Cl.[6] ..................................................... F16D 31/02

[52] U.S. Cl. ................................................ 60/325; 60/459

[58] Field of Search ....................................... 60/325, 459

[56] References Cited

U.S. PATENT DOCUMENTS

| | | | |
|---|---|---|---|
| 4,099,379 | 7/1978 | Budzich | 91/421 X |
| 4,800,990 | 1/1989 | Blain | 91/421 X |
| 5,314,315 | 5/1994 | Tcholakov | 417/540 |
| 5,579,676 | 12/1996 | Wilke | 91/421 X |
| 5,609,088 | 3/1997 | Park | 91/421 X |

FOREIGN PATENT DOCUMENTS 4-67941 6/1992 Japan .

*Primary Examiner*—Hoang Nguyen
*Attorney, Agent, or Firm*—Morrison & Foerster LLP

[57] ABSTRACT

A pressure loss compensation device for a fluid pressure circuit automatically compensates a pressure loss of a working fluid pressure as required or regularly, in the fluid pressure circuit. A cylinder device forming the pressure loss compensation device is provided in the intermediate position of piping of the fluid pressure circuit. The cylinder device has an actuation pressure introducing chamber introducing a pneumatic pressure and a fluid pressure generating chamber communicated with the piping via a branch pipe provided with a check valve. A return spring is provided in a piston and a fluid induction pipe communicated with an oil pan is connected to the fluid pressure generating chamber. An excessive pressure introducing port is communicated with a drain port when the piston is shifted toward the fluid pressure generating chamber. The excessive pressure introducing port is connected to the piping via a relief valve. A gap serving as an orifice is provided between the excessive pressure introducing port and the drain port, which gap is adapted to be closed by the piston at the lowered position.

12 Claims, 8 Drawing Sheets

PRESSURE LOSS COMPENSATION DEVICE OF A FLUID PRESSURE CIRCUIT AND CAM ARRANGEMENT INCORPORATING THE SAME

BACKGROUND OF THE INVENTION

1. Field of the Invention

The present invention relates to a pressure loss compensation device of a fluid pressure circuit in which a fluid pressure generated in a fluid pressure source is supplied to a fluid pressure actuator through piping, and a cam arrangement which incorporates the pressure loss compensation device.

2. Description of the Related Art

In general, there have been a large number of fluid pressure circuits for driving actuators employing fluid pressure. For instance, a picking and placing apparatus disclosed in Japanese Unexamined Utility Model Publication (Kokai) No. Heisei 4-67941, employs a hydraulic circuit using a hydraulic pressure as a fluid pressure.

The picking and placing apparatus causes compound movement of an output shaft necessary for tool changing in a machine tool, by means of gears. The hydraulic circuit is employed for clamping and unclamping the tool in synchronism with rotation of an input shaft. Namely, the hydraulic circuit includes a pump device as a hydraulic pressure source generating a pulsating hydraulic pressure in synchronism with rotation of the input shaft, and an actuator, in which the hydraulic pressure generated by the pump device is introduced. The actuator is provided in a clamping device of the tool so that a rod cooperated with the actuator is projected for unclamping the tool by introducing the hydraulic pressure into the actuator.

However, in the conventional fluid pressure circuit set forth above, it is inherent to cause leakage of fluid in a structural portion of hydraulic devices per se, such as the pump device, actuator and so forth, connecting portion between the hydraulic devices and piping, through long time use. Leakage of the pressurized fluid apparently leads pressure loss to cause difficulty in supplying necessary pressure to the actuator or, in the worse case, to cause failure of operation.

SUMMARY OF THE INVENTION

The present invention has been worked out in view of the problem in the prior art set forth above. Therefore, it is an object of the present invention to provide a pressure loss compensation device of a fluid pressure circuit which can automatically compensate pressure loss of a working fluid as required or in regular basis and thus assures supply of a necessary fluid pressure.

Another object of the present invention is to provide a cam arrangement which incorporates the pressure loss compensation device of the fluid pressure circuit.

In order to accomplish the above-mentioned object, according to one aspect of the present invention, a pressure loss compensation device of a fluid pressure circuit in which a fluid pressure generated in a fluid pressure source is supplied to an actuator via piping, wherein a fluid pressure compensator compensating a pressure loss of the fluid pressure in the fluid pressure circuit is provided at the mid portion of the piping.

On the other hand, the fluid pressure compensator may include a piston slidably disposed within a casing, an actuation pressure introducing chamber provided at one end of the casing and introducing an actuation pressure depressing the piston, a fluid pressure generating chamber provided at the other end of the casing and communicated with the piping through a branch pipe, and a check valve provided in the branch pipe and permitting only flow of a working fluid from the fluid pressure generating chamber to the piping.

The actuation pressure to be supplied into the actuation pressure introducing chamber may be a pneumatic pressure.

Also, a return spring applying a biasing force for biasing the piston toward the actuation pressure introducing chamber may be provided, a fluid induction pipe communicated with a fluid reservoir may be connected to the fluid pressure generating chamber, a check valve permitting only fluid flow toward the fluid pressure generating chamber may be provided in the fluid induction pipe, an excessive pressure introducing port may be provided in the casing for communication with a drain port when the piston may be shifted toward the fluid pressure generating chamber, and the excessive pressure introducing port may be connected to the piping via a relief pipe.

The excessive pressure introducing port may be communicated with the drain port via a gap serving to provide an orifice effect, the gap being opened by shifting of the piston toward the fluid pressure generating chamber.

The relief pipe may be connected to a portion of the piping, where an air is easily accumulated.

According to another aspect of the present invention, a pressure loss compensation device of a fluid pressure circuit, in which a fluid pressure generated by a fluid pressure source is supplied to an actuator via piping, comprises:

- a fluid pressure compensator disposed at a mid portion of the piping for compensating a pressure loss of a fluid pressure within the fluid pressure circuit, the fluid pressure compensator being constructed with a cylinder device which includes:
- a piston slidably disposed within a casing;
- an actuation pressure introducing chamber provided at one end of the casing and introducing a pneumatic pressure depressing the piston;
- a fluid pressure generating chamber provided at the other end of the casing and communicated with the piping through a branch pipe;
- a check valve provided in the branch pipe for permitting only flow of fluid from the fluid pressure generating chamber to the piping;
- a return spring provided in the casing and providing a biasing force for biasing the piston toward the actuation pressure introducing chamber;
- a fluid induction pipe connected to the fluid pressure generating chamber for communicating the latter to a fluid reservoir;
- a check valve provided in the fluid induction pipe for permitting only flow of fluid toward the fluid pressure generating chamber;
- an excessive pressure induction port provided in the casing and communicating with a drain port when the piston is shifted toward the fluid pressure generating chamber; and
- a relief pipe connecting between the excessive pressure introducing port and the piping.

The excessive pressure introducing port may be communicated with the drain port via a gap serving to provide an orifice effect, the gap being opened by shifting of the piston toward the fluid pressure generating chamber.

The relief pipe may be connected to a portion of the piping, where an air is easily accumulated.

According to a further aspect of the present invention, a cam arrangement comprises:

a first cam rotatingly driven by an input shaft for outputting a motion to an output shaft, and a second cam arranged in parallel with the first cam on the input shaft in coaxial fashion;

a fluid pressure source driven by the second cam via a swing lever;

a fluid pressure circuit connected to the fluid pressure source for supplying a fluid pressure to an actuator; and a fluid pressure compensator provided at an intermediate position of the piping for compensating a pressure loss of the fluid pressure in the fluid pressure circuit.

According to a still further aspect of the present invention, a cam arrangement comprises:

a first cam rotatingly driven by an input shaft for outputting a motion to an output shaft, and a second cam arranged in parallel with the first cam on the input shaft in coaxial fashion;

a fluid pressure source driven by the second cam via a swing lever;

a fluid pressure circuit connected to the fluid pressure source for supplying a fluid pressure to an actuator through piping;

a fluid pressure compensator provided at an intermediate position of the piping for compensating a pressure loss of the fluid pressure in the fluid pressure circuit, the fluid pressure compensator being constructed with a cylinder device which includes:

a piston slidably disposed within a casing;

an actuation pressure introducing chamber provided at one end of the casing and introducing a pneumatic pressure depressing the piston;

a fluid pressure generating chamber provided at the other end of the casing and communicated with the piping through a branch pipe;

a check valve provided in the branch pipe for permitting only flow of fluid from the fluid pressure generating chamber to the piping;

a return spring provided in the casing and providing a biasing force for biasing the piston toward the actuation pressure introducing chamber;

a fluid induction pipe connected to the fluid pressure generating chamber for communicating the latter to a fluid reservoir;

a check valve provided in the fluid induction pipe for permitting only flow of fluid toward the fluid pressure generating chamber;

an excessive pressure induction port provided in the casing and communicating with a drain port when the piston is shifted toward the fluid pressure generating chamber; and a relief pipe connecting between the excessive pressure introducing port and the piping.

The excessive pressure introducing port may be communicated with the drain port via a gap serving to provide an orifice effect, the gap being opened by shifting of the piston toward the fluid pressure generating chamber.

The relief pipe may be connected to a portion of the piping, where an air is easily accumulated.

With the construction set forth above, the operation of the pressure loss compensation device of the fluid pressure circuit according to the present invention will be discussed hereinafter.

In the pressure loss compensator of the fluid pressure circuit according to the present invention, since the pressure loss of the fluid pressure in the fluid pressure circuit is compensated by the fluid pressure compensating device provided at the mid portion of the piping supplying the fluid pressure generated by the fluid pressure source, the working fluid pressure in the fluid pressure circuit can be constantly maintained at the necessary pressure to assure accurate operation of the actuator.

On the other hand by supplying the actuation pressure to the actuation pressure introducing chamber of the cylinder device, the actuation pressure acts on one end of the piston to depress for shifting toward the other end. Then, the fluid pressure in the fluid pressure generating chamber at the other end is elevated to supply the fluid pressure in the fluid pressure generating chamber to the piping of the fluid pressure circuit via the branch pipe. Thus, the pressure loss generated in the fluid pressure circuit can be compensated. Accordingly, the fluid pressure in the fluid pressure circuit can be maintained constant to accurately actuate the actuator.

On the other hand, since the check valve is provided in the branch pipe, the fluid pressure once supplied within the fluid pressure circuit is prevented from surging into the fluid pressure generating chamber.

Furthermore, since the actuation pressure to be supplied to the actuation pressure introducing chamber is the pneumatic pressure, the piston can be pushed with damping effect as the air is compressive fluid to avoid abrupt variation of the fluid pressure generating chamber to smoothly compensate the fluid pressure in the fluid pressure circuit.

Also, since the return spring, providing the biasing force for the piston toward the actuation pressure introducing chamber, is provided, when supply of the actuation pressure to the actuation pressure introducing chamber is terminated, the piston is moved toward the actuation pressure introducing chamber by the return spring to make the fluid pressure generating chamber in vacuum condition. By this, the working fluid in the fluid reservoir can be introduced into the fluid pressure introducing chamber via the fluid induction pipe to certainly maintain the fluid pressure to be supplied in the fluid pressure circuit in the next time.

On the other hand, since the check valve is provided in the fluid induction pipe for permitting only flow of the fluid toward the fluid pressure generating chamber, the pressure generated in the fluid pressure generating chamber will not escape to the fluid reservoir via the fluid induction pipe.

When the fluid pressure in the fluid pressure generating chamber is supplied to the fluid pressure circuit for compensation, the excessive pressure developed in the fluid pressure circuit can be relieved through the relief pipe, the excessive pressure introducing port to the drain port. Thus, the fluid pressure in the fluid pressure circuit can be maintained constant.

Also, since the relief pipe is connected to the portion of the piping where the air is easily accumulated, the air accumulated in the piping can be discharged simultaneously with draining of the excessive fluid pressure through the relief pipe. Thus, the air to be admixed into the fluid in the fluid pressure circuit can be discharged to develop the predetermined pressure to assure accurate operation of the actuator.

On the other hand, in case of the cam arrangement provided with the pressure loss compensation device in the fluid pressure circuit according to the present invention, when the input shaft is rotated, the first cam is rotated. According to rotation of the first cam, the output shaft is driven. On the other hand, the second cam arranged in parallel to the first cam in coaxial fashion is rotated in synchronism therewith to cause rotational swing motion of the swing lever for driving the fluid pressure source. The fluid pressure generated by the fluid pressure source is supplied to the actuator for driving the latter. At this time, the fluid pressure is compensated the pressure loss in the fluid pressure circuit by the fluid pressure compensator provided at the intermediate position in the piping which supplies the fluid pressure to the actuator. Thus, working fluid pressure of the fluid pressure circuit is certainly maintained at the predetermined pressure.

By building-in the fluid pressure source within the housing, whole construction of the cam arrangement can be made compact. Since the second cam driving the fluid pressure source is synchronously rotated by arranging the same coaxially on the common input shaft with the first cam driving the output shaft, the motion timing of the output shaft and the driving timing of the actuator by the fluid pressure source can be certainly made consistent with each other. Thus, high speed operation of the cam arrangement becomes possible. Particularly, delay of actuation timing of the actuator and failure of operation can be prevented by the fluid pressure compensator to improve accuracy of operation in the actuator. Thus, further high speed operation of the device becomes possible.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

Figure 1:
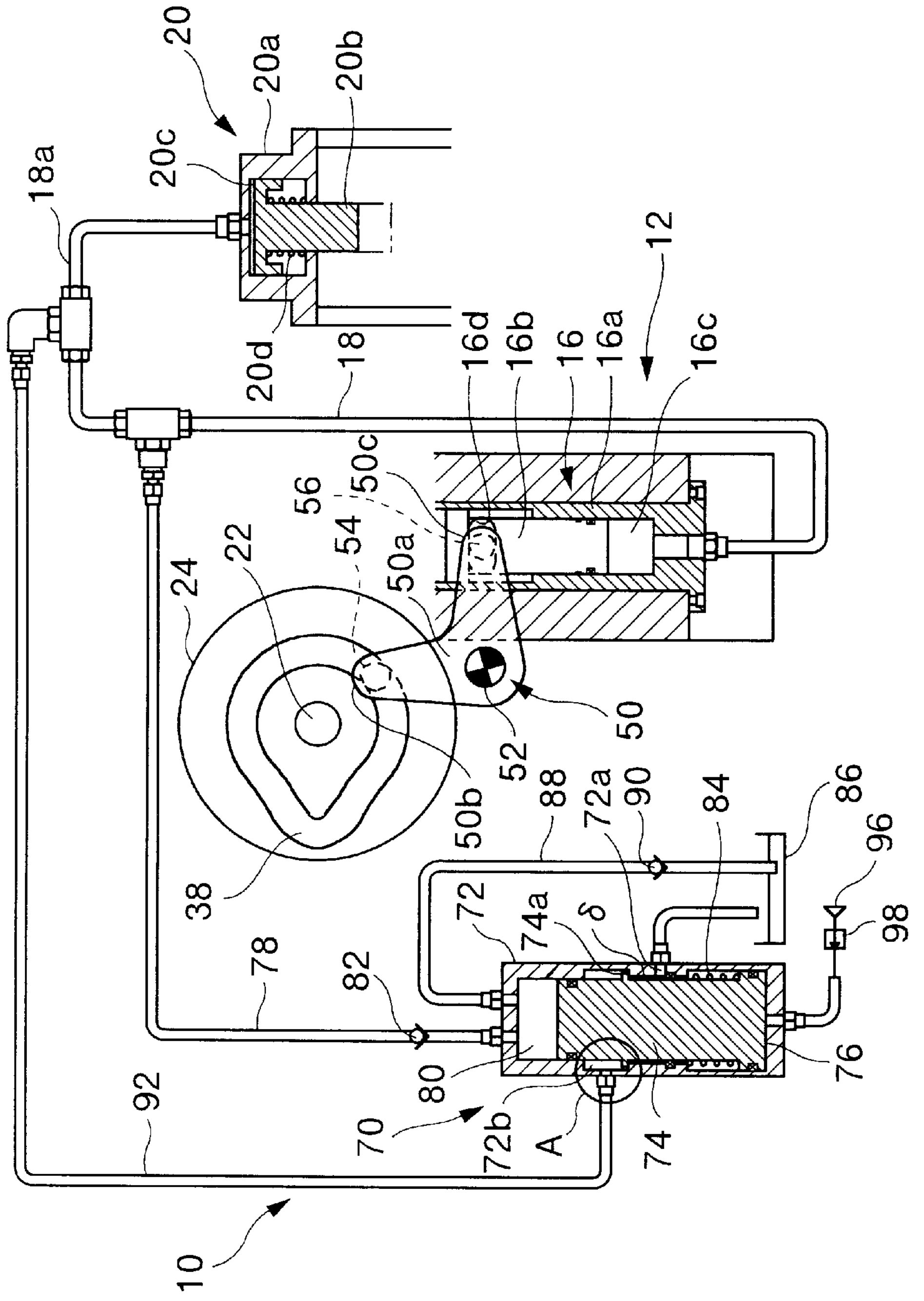
FIG. 1 is a diagrammatic illustration of a fluid pressure circuit in an initial condition of the preferred embodiment of a pressure loss compensation device according to the present invention.
Figure 2:
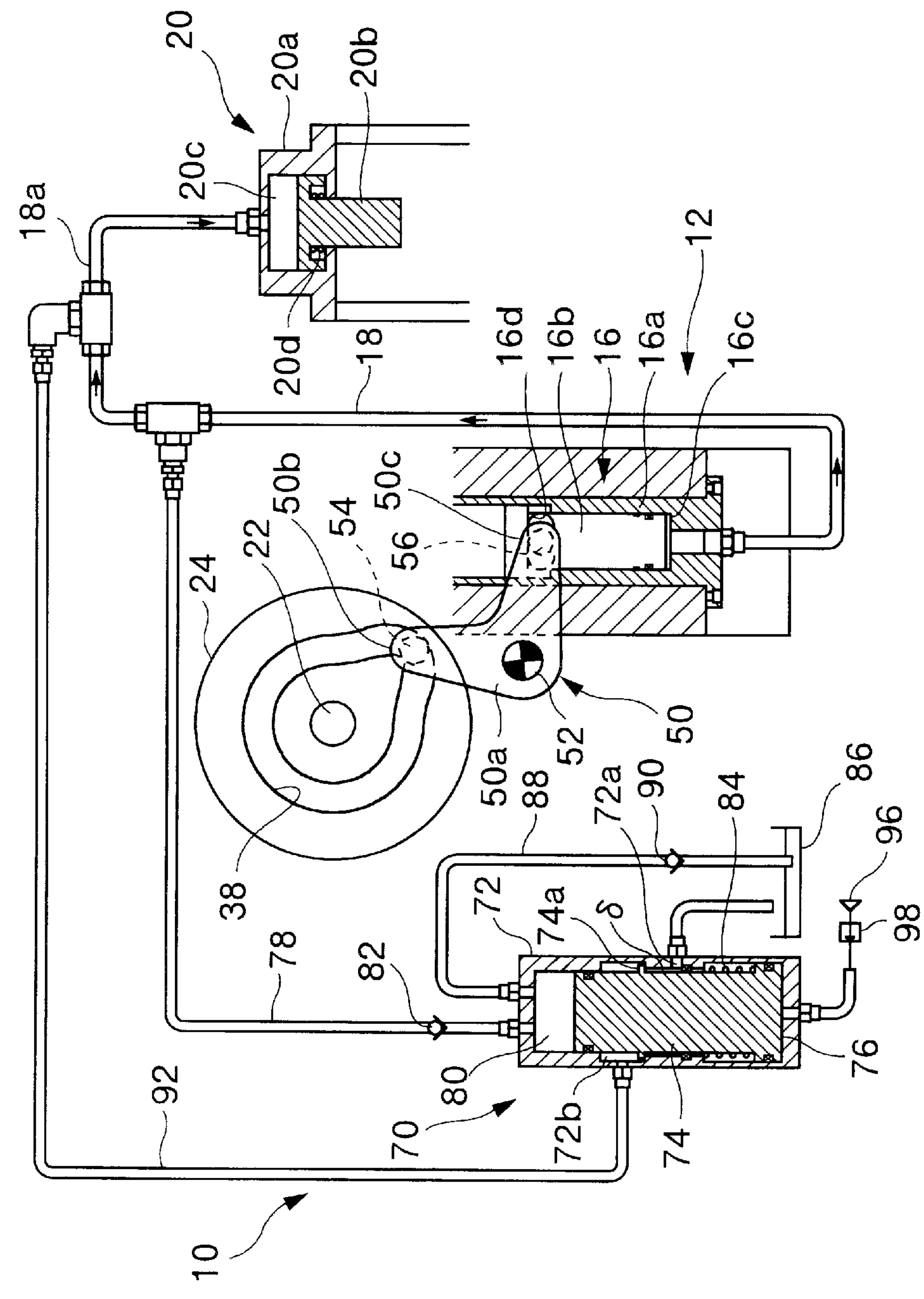
FIG. 2 is a similar diagrammatic illustration of the fluid pressure circuit with the preferred embodiment of the pressure loss compensation device of the present invention in a condition where a fluid pressure is generated in the fluid pressure circuit.
Figure 3:
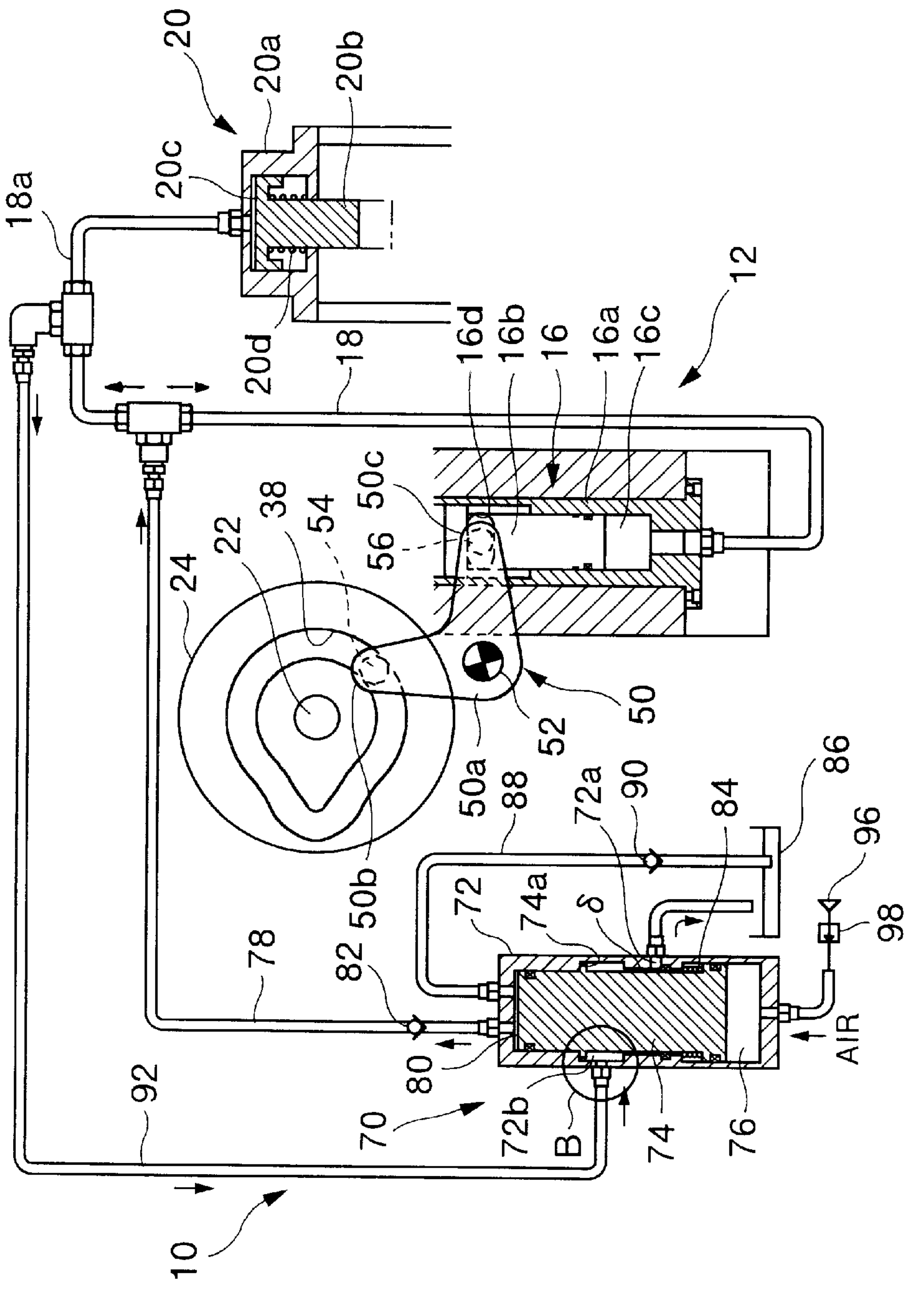
FIG. 3 is a similar diagrammatic illustration of the fluid pressure circuit with the preferred embodiment of the pressure loss compensation device of the present invention in an operating condition.

Discussion will be given hereinafter in connection with a fluid pressure circuit 12 employing the preferred embodiment of a pressure loss compensation device 10, as shown in FIGS. 1 to 3, which fluid pressure circuit 12 is applied for a tool changer 14 shown in FIG. 6 as a cam arrangement. The fluid pressure circuit 12 includes a hydraulic pump 16 as a fluid pressure source and an actuator 20, to which a hydraulic pulsating pressure generated by the hydraulic pump 16 is supplied via a piping 18.

The hydraulic pump 16 has a piston 16*b* slidably disposed within a casing 16*a*. When the piston 16*b* is shifted in a cylinder chamber 16*c*, a hydraulic pressure is generated in the cylinder chamber 16*c*. On the other hand, in the actuator 20, the piston 20*b* slidably engaged within the cylinder 20*a* is shifted downwardly in the drawing by the hydraulic pressure introduced into a hydraulic pressure introducing chamber 20*c*. The piping 18 is communicated with the cylinder chamber 16*c* and the hydraulic pressure introducing chamber 20*c*.

The hydraulic pump 16 is driven in response to rotation of a roller gear cam 24 for creating the compound movement of the tool changer 14 necessary for changing the tools from rotational motion of an input shaft 22. Namely, as shown in FIGS. 7 to 10, in the tool changer 14, the input shaft 22 is mounted within a housing 26, and the roller gear cam 24 formed as a globoidal cam is mounted on the input shaft 22 for integral rotation therewith. On the outer periphery of the roller gear cam 24, a tapered rib 24*a* having a predetermined geometric curve is formed. To the tapered rib 24*a*, a cam follower 30 of a follower turret 28 is engaged.

The rotation of the roller gear cam 24 is converted into a rotational swing motion by the follower turret 28. The rotational swing motion thus created by the follower turret 28 is transmitted to an output shaft 32 splined to the former, to cause rotational swing motion of the output shaft 32. As shown in FIG. 6, a tool holding arm 34 mounted on the output shaft 32 is thus pivoted over 180°. In FIG. 6, the tool changer 14 is installed in up-side-down fashion.

Figure 9:
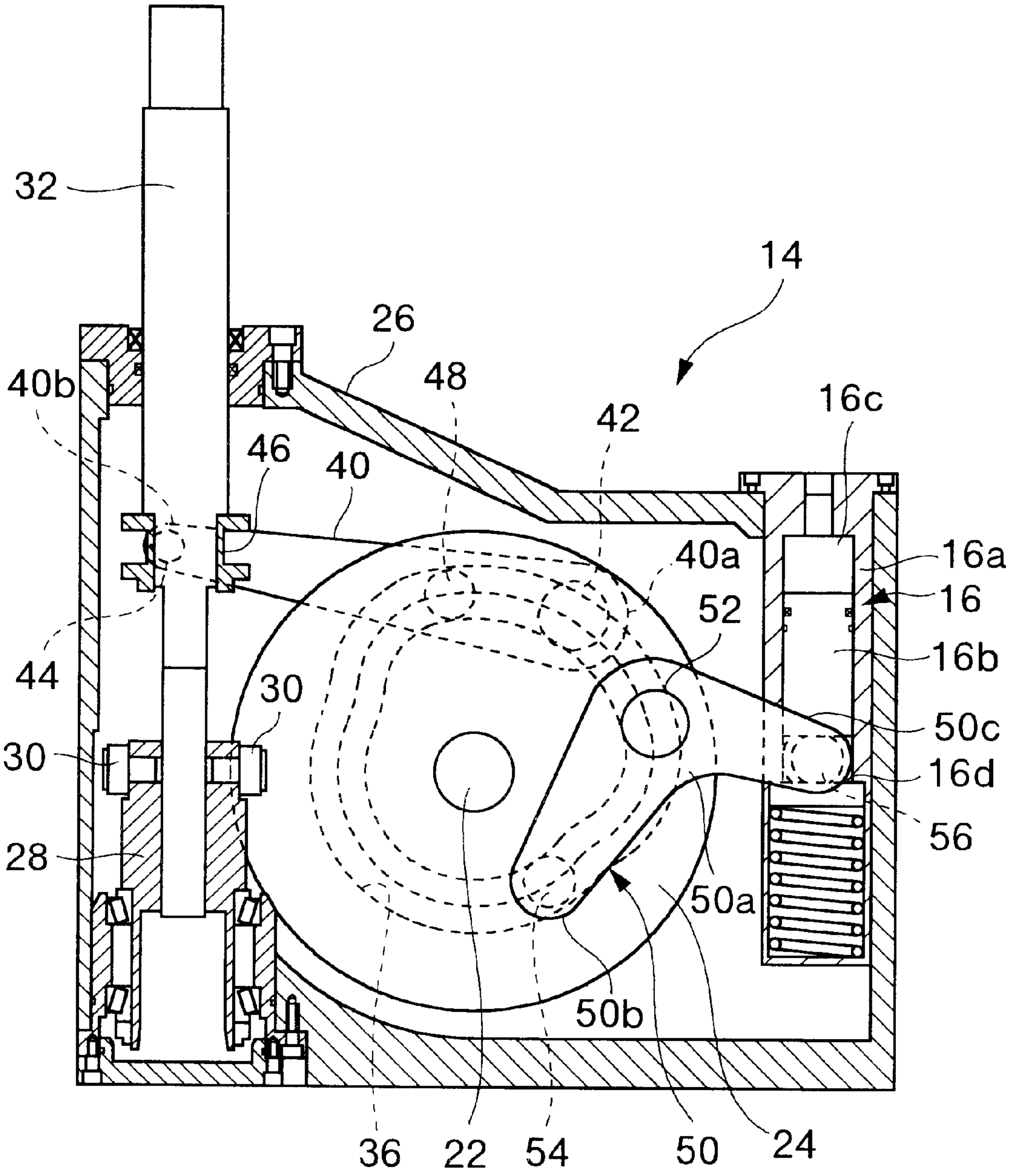
FIG. 9 is an enlarged sectional plan view of the major part of the tool changer in an operating condition where the fluid pressure of the fluid pressure source is not generated.

On one side surface of the roller gear cam 24 (distal side in FIG. 7), a first endless grooved cam 36 is formed with a predetermined geometric curve (see FIG. 9). On the other side surface (proximal side of FIG. 7), a second endless grooved cam 38 having a predetermined geometric curve is formed. On the side where the first grooved cam 36 is formed, a first pivoting lever 40 is pivotably mounted on the housing 26 at a base end 40*a* via a pivot shaft 42. A cam follower 44 provided on a tip end portion 40b of the first pivoting lever 40 engages with a peripheral groove 46 provided on the output shaft 32. The cam follower 48 provided at an intermediate portion of the first pivoting lever 40 is engaged with the first grooved cam 36 for causing vertical swing motion of the first pivoting lever 40 about the pivot shaft 42 by rotation of the roller gear cam 24. By swing motion of the first pivoting lever 40, the output shaft 32 is reciprocally shifted in the axial direction to cause vertical reciprocal motion of the tool holding arm 34.

On the other hand, on the side where the second grooved cam 38 is formed, a second pivoting lever 50 is disposed, intermediate portion 50*a* of which is pivotably mounted on the housing 26 via a pivot shaft 52. A cam follower 54 provided at one end portion 50*b* of the second pivoting lever 50 is engaged with the second grooved cam 38. On the other hand, a cam follower 56 provided on the other end portion 50*c* of the second pivoting lever 50 is engaged with an engaging groove 16*d* formed on a piston 16*b* of the hydraulic pump 16.

By rotation of the roller gear cam 24, the second pivoting lever 50 is driven to pivot about the pivot shaft 52 by the second grooved cam 38 to shift the piston 16*b* engaged with the cam follower 56 on the other end 50*c* of the second pivoting lever 50. Accordingly, by shifting the piston 16*b* toward the cylinder chamber 16*c*, the hydraulic pressure is generated in the cylinder chamber 16*c* to supply the hydraulic pressure to the actuator 20.

Figure 6:
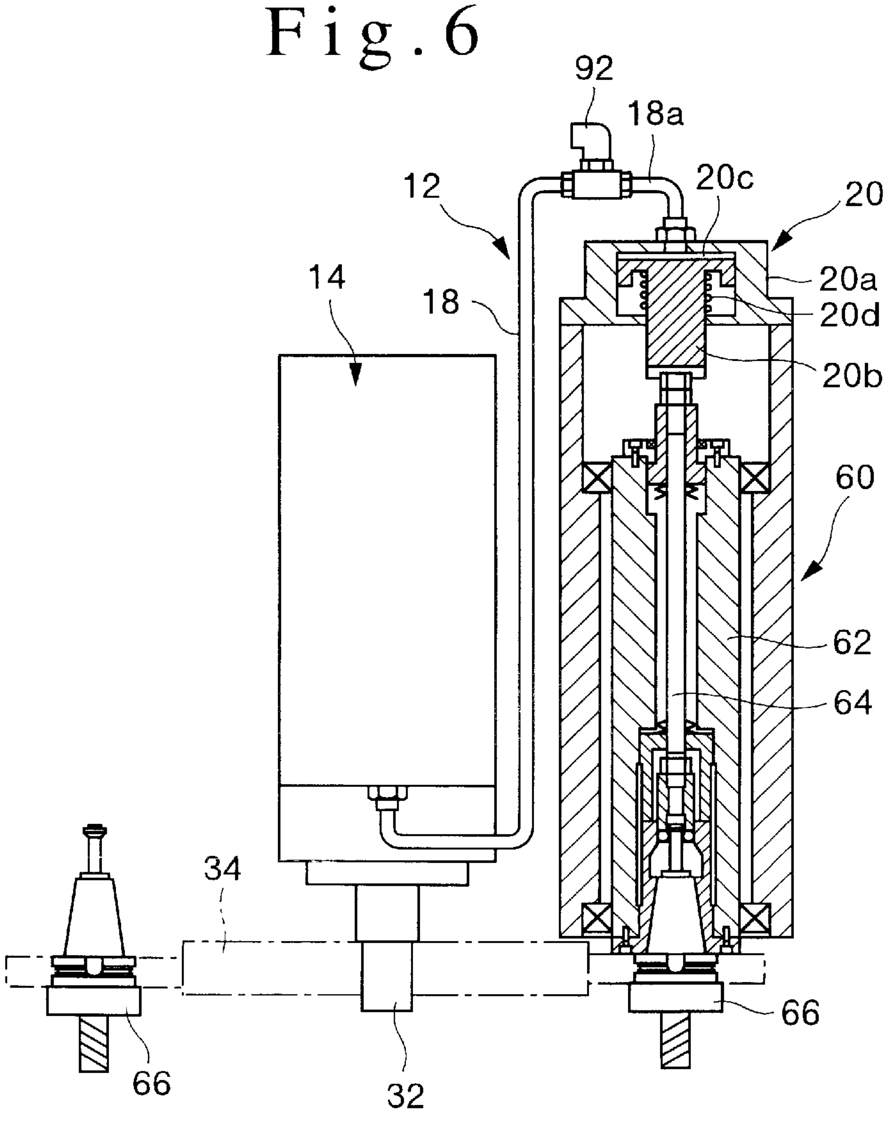
FIG. 6 is a sectional front elevation of a major part of a tool changer having the preferred embodiment of the pressure loss compensation device of the fluid pressure circuit according to the invention.

The actuator 20 is mounted on a spindle portion 60 of the machine tool, as shown in FIG. 6. The lower end of the piston 20*b* of the actuator 20 is contacted with the upper end of an actuation rod 64 arranged at the central position of the spindle 62 for vertical movement. Then, the hydraulic pressure is introduced into the hydraulic pressure introducing chamber 20*c* of the actuator 20 to lower the piston 20*b* to push the actuation rod 64 to release a tool 66 held on the lower end of the spindle 62.

At the intermediate position of the piping 18 of the fluid pressure circuit 12, a cylinder device 70 as a fluid pressure compensator for compensating hydraulic pressure loss of the hydraulic pressure in the fluid pressure circuit 12 is provided. The cylinder device 70 includes a piston 74 slidably engaged with a casing 72, an actuating pressure introducing chamber 76 provided on one end side of the casing 72 and introducing an actuation pressure pushing the piston 74 and a fluid pressure generating chamber 80 provided on the other end side of the casing 72 and communicated with the piping 18 via a branch pipe 78. On the other hand, to the branch pipe 78, a check valve 82 permitting only fluid flow in the direction from the fluid pressure generating chamber 80 to the pipe 18, is provided.

Furthermore, for the piston 74, a return spring 84 providing a bias force toward the actuation pressure introducing chamber 76 is provided. Also, a fluid induction pipe 88 communicated with an oil pan 86 is connected in the fluid pressure generating chamber 80 of the casing 72. On the other hand, in the fluid induction pipe 88, a check valve 90 permitting only fluid flow in the direction toward the fluid pressure generating chamber 80. On the other hand, a drain port 72*a* is provided in the casing 72 at the intermediate position thereof, and an excessive pressure introducing port 72*b* communicated with the drain port 72*a* is provided upon shifting of the piston 72 toward the fluid pressure generating chamber 80. The excessive pressure introducing port 72*b* is connected to the piping 18 via a relief pipe 92. At this time, the relief pipe 92 is connected to a portion 18*a* where the piping 18 is curved or bend from upper side to lower side, in which air is easily accumulated.

Figure 4:
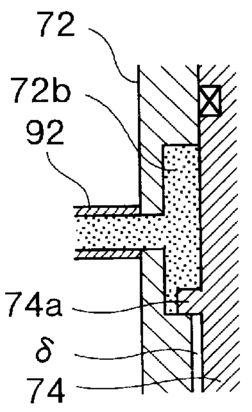
FIG. 4 is an enlarged section of the major part showing a portion A of FIG. 1.

The excessive pressure introducing port 72*b* has a lengthwise dimension of the casing 72 slightly longer than a shifting stroke of the piston 74. Thus, the flange portion 74*a* formed on the piston 74 is engaged with the excessive pressure introducing port 72*b*. On the other hand, between the piston 74 and the casing 72, a gap 6 performing an orifice effect is provided between the excessive pressure introducing port 72*b* and the drain port 72*a*. As shown in FIG. 4, the flange portion 74*a* is designed to close the gap $\delta$ in the condition where the piston 74 is lowered. A working fluid discharged from the drain port 72*a* is returned to an oil pan 86. Here, in the actuation pressure introducing chamber 76, a pneumatic pressure supplied from a pneumatic pressure source 96 is introduced through a pressure regulating device 98.

With the construction set forth above, the tool changer 14 exemplified in the shown embodiment, the hydraulic pressure generated in the hydraulic pump 16 of the fluid pressure circuit 12 is supplied to the actuator 20 to depress the actuation rod 64 of the spindle portion 60 shown in FIG. 6 to release the tool 66 from the spindle 62, as shown in FIGS. 1 to 3. The tool 66 is held at both end portions of the tool holding arm 34. Thus, by performing vertical shifting motion and pivoting operation over 180° by the tool changer 14, the tools 66 to be set on the spindle portion 60 can be automatically changed.

Discussing in greater detail, the tool changer 14 has the following design. When the input shaft 22 is driven to rotate, the roller gear cam 24 is rotated according to rotation of the input shaft 22. By the cam follower 30 engaging with the tapered rib 24*a* formed on the outer periphery of the roller gear cam 24, the follower turret 28 is driven to cause rotational swing motion. Thus, the output shaft 32 splined with the follower turret 28 is driven to cause rotational swing motion. On the other hand, by the first grooved cam 36 formed on one side surface of the roller gear cam 24, the first swing lever 40 causes vertical swing motion. Thus, the output shaft 32 is driven by the vertical swing motion of the first swing lever 40 to cause vertical reciprocal motion according to sliding motion in the splined portion relative to the follower turret 28.

On the other hand, in the fluid pressure circuit 12, the hydraulic pump 16 generates the hydraulic pressure by swing motion of the second swing lever 50 engaging with the second grooved cam 38 according to rotation of the roller gear cam 24 provided on the input shaft 22 of the tool changer 14. Namely, the hydraulic pressure is generated in synchronism with operation of the tool holding arm 34. In the clamping condition where the tool 66 is held in the spindle portion 60, the piston 16*b* is located at the lowered position so that the hydraulic pressure is not generated in the cylinder portion 16*c*. On the other hand, upon unclamping, at which the tool 66 is released from the spindle portion 60, piston 16*b* is pushed up so that the hydraulic pressure is generated in the cylinder chamber 16*c*.

Thus, the hydraulic pump 16 may generate a hydraulic pulsating pressure in the fluid pressure circuit 12 in synchronism with the operation of the tool changer 14. In the condition of FIG. 1, where the hydraulic pressure is not generated, the piston 20*b* of the actuator 20 is located at the upwardly shifted position by a return spring 20*d* for maintaining the spindle portion 60 in clamped condition. On the other hand, in the condition of FIG. 2 where the hydraulic pressure is generated, the piston 20*b* of the actuator 20 is located at the downwardly shifted position to place the spindle portion 60 in unclamped condition.

Figure 7:
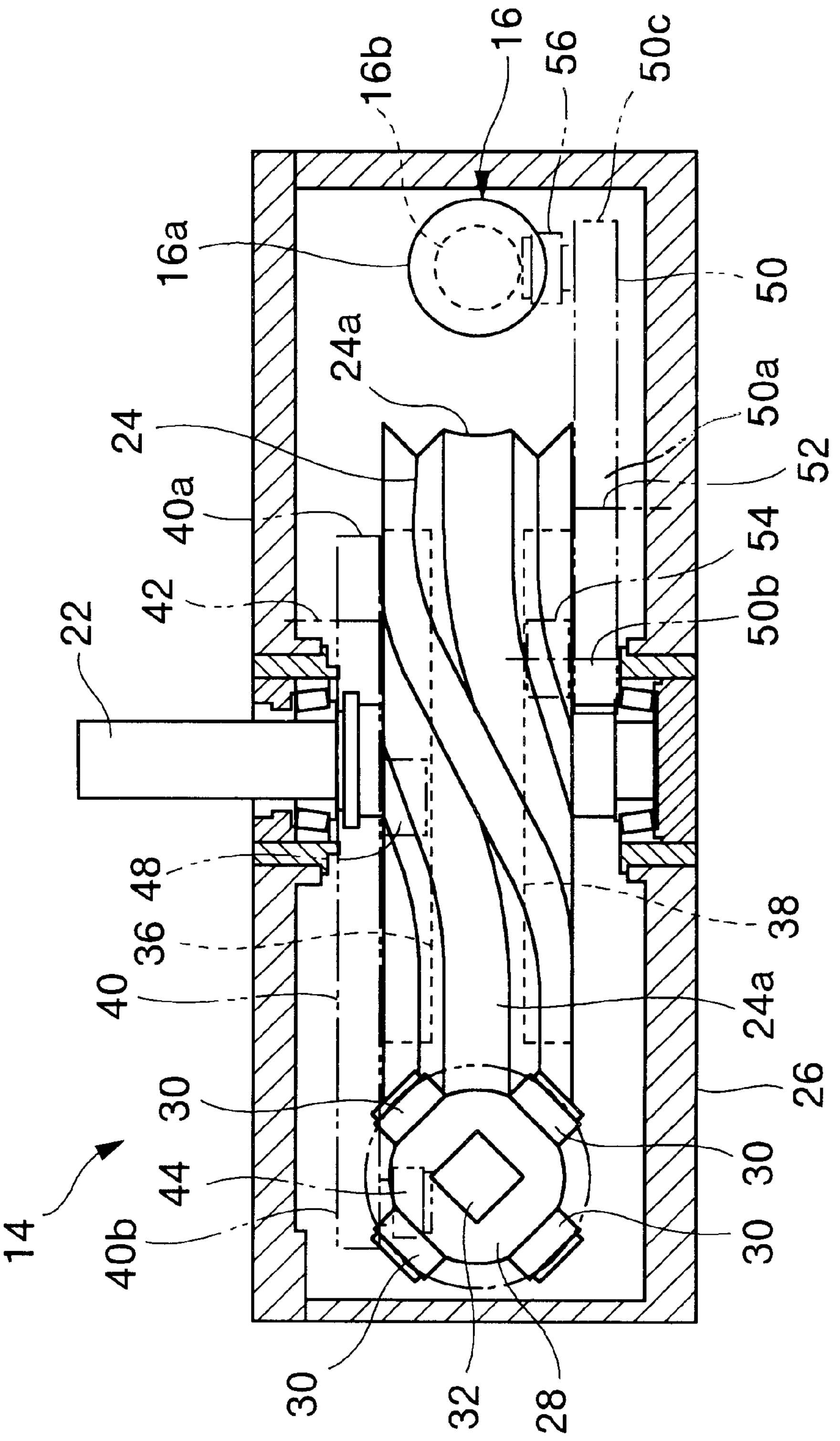
FIG. 7 is an enlarged sectional front elevation of the major part of the tool changer in a condition where a fluid pressure of the fluid pressure source is not generated.
Figure 8:
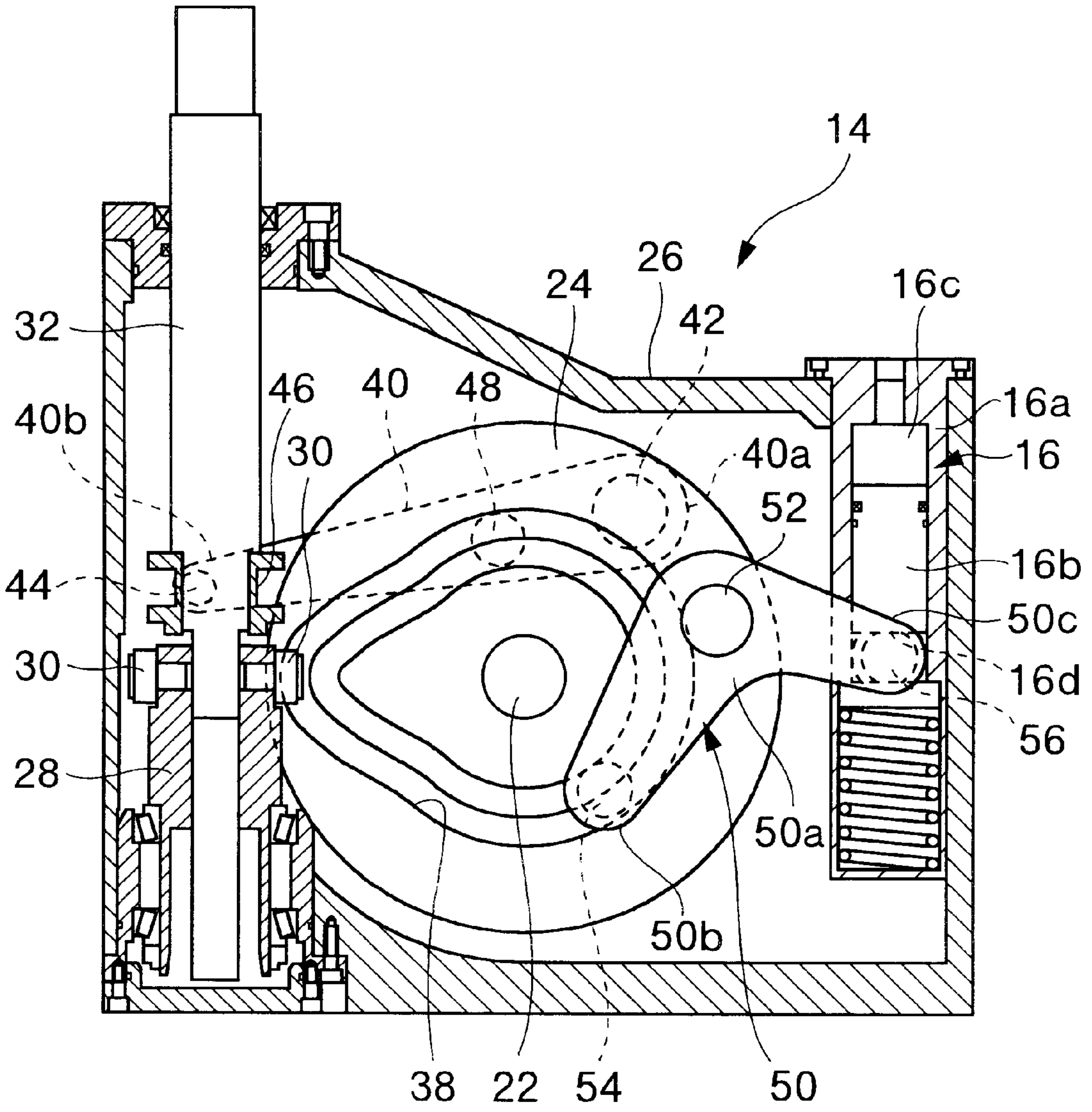
FIG. 8 is an enlarged sectional plan view of the major part of the tool changer.
Figure 10:
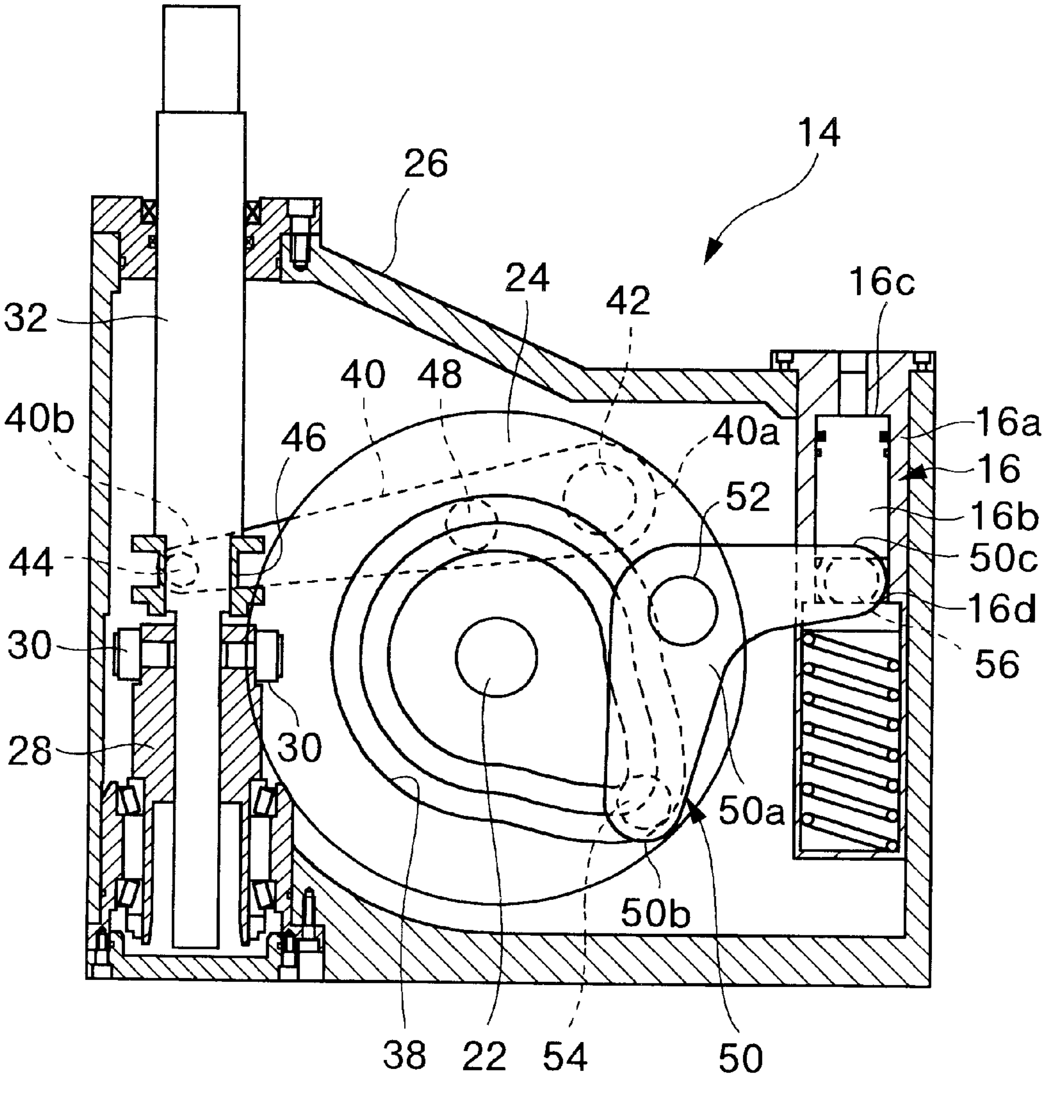
FIG. 10 is an enlarged sectional plan view of the major part of the tool changer in an operating condition where the fluid pressure of the fluid pressure source is generated.

During operation as set forth above, FIG. 7 illustrates the condition immediately after clamping of the tool 66 by the spindle portion 60 of the tool changer 14. At this time, the tool holding arm 34 is located at the upwardly shifted position in the vicinity of the spindle portion 60. On the other hand, FIG. 9 illustrates a condition where the tool holding arm 34 is lowered to be placed away from the spindle portion 60, subsequently from the condition shown in FIG. 7. In FIG. 10, there is shown a condition where the tool holding arm 34 is upwardly shifted again after pivoting over 180°, where the spindle portion 60 is in receipt of the unclamped tool 66. The tool changer 14 performs the series of operation as illustrated in FIGS. 7, 9 and 10 for changing the tool 66 to be used by the machine tool.

Here, discussion will be given in connection with the cylinder device 70 provided in the pressure loss compensation device 10. When the piston 16b of the hydraulic pump 16 is pushed down and thus the hydraulic pressure is built-up in the fluid pressure circuit 12, a pneumatic pressure is not supplied to the actuation pressure introducing chamber 76 of the cylinder device 70. At this condition, the piston 74 is located at the lowered position as biased by the return spring 84. Also, a gap δ between the excessive pressure introducing port 72*b* and the drain port 72*a* is held in a closed position by the flange 74*a* as shown in FIG. 4. Accordingly, the hydraulic pressure generated in the fluid pressure circuit 12 is blocked by the check valve 82 in the branch pipe 78. In conjunction therewith, since the gap δ is blocked by the flange portion 74*a* at the relief pipe 92, surge flow is prevented. Therefore, the hydraulic pressure of the hydraulic pump 16 is supplied to the actuator 20 as is to certainly perform unclamping operation of the spindle portion 60.

When pressure loss is caused due to leakage of the working fluid in the fluid pressure circuit 12 for occurrence of secular change, by supplying the pneumatic pressure from a pneumatic pressure source 96 to the actuation pressure introducing chamber 76 of the cylinder device 70, the piston 74 is pushed up to generate a compensating hydraulic pressure in the fluid pressure generating chamber 80 as shown in FIG. 3. The compensating hydraulic pressure is supplied to the piping 18 via the branch pipe 78. Accordingly, the fluid pressure circuit 12 is compensated the hydraulic pressure within the circuit 12 by the compensating hydraulic pressure so that the working fluid pressure in the fluid pressure circuit 12 can be certainly and constantly maintained at the necessary pressure or higher. Therefore, the actuator 20 can be constantly operated accurately.

Figure 5:
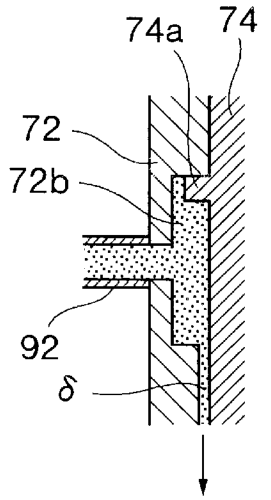
FIG. 5 is an enlarged section of the major part showing a portion B of FIG. 3.

At the condition where the piston 74 is in the upwardly shifted position for supplying the compensating hydraulic pressure, the flange portion 74*a* is elevated to establish communication between the excessive pressure introducing port 72*b* and the drain port 72*a* via the gap δ, as shown in FIG. 5. Therefore, if the hydraulic pressure in the fluid pressure circuit 12 becomes excessively high by supply of the compensating hydraulic pressure from the cylinder device 70, the excessive pressure is drained to the drain port 72*a* via the relief pipe 92, the excessive pressure introducing port 72*b* and the gap δ. At this time, since the gap δ is a narrow passage performing orifice effect, the hydraulic pressure in the fluid pressure circuit 12 may not be drained abruptly and thus can drain only excessive part of the pressure.

Since the relief pipe 92 is connected to the portion 18*a* of the piping 18, where air is easily accumulated, the air accumulated in the piping 18 can be discharged when the excessive hydraulic pressure is drained through the relief pipe 92. By this, admixing of air in the working fluid in the fluid pressure circuit 12 can be avoided to permit development of the predetermined magnitude of pressure to certainly operate the actuator 20 without causing failure in operation, such as delay of timing.

By discharging the pneumatic pressure from the working pressure introducing chamber 76 after compensation of the hydraulic pressure within the fluid pressure circuit 12, the piston 74 in the cylinder device 70 is shifted downwardly to return to the initial condition shown in FIG. 1, by the return spring 84. At this time, a negative pressure is generated in the fluid pressure generating chamber 80 associating with downward motion of the piston 74. Therefore, the working fluid in the oil pan 86 is supplied into the fluid pressure generating chamber 80 via the fluid introducing pipe 88.

In the show n construction, the pneumatic pressure is introduced into the working pressure introducing chamber 76 for actuating the cylinder device 70. Since air is a compressive fluid, the piston 74 may be pushed with damping effect to avoid abrupt variation of the pressure in the fluid pressure generating chamber 80 to permit smooth compensation of the hydraulic pressure for the fluid pressure circuit 12.

On the other hand, in th e tool changer 14, by building-in the hydraulic pump 16 within the housing 26, downsizing of the tool changer 14 can be achieved. Furthermore, since the second grooved cam 38 for driving the hydraulic pump 16 is formed on the roller gear cam 24, on which the tapered rib 24*a* and the first grooved cam 36 for swing motion and vertical reciprocal motion of the output shaft 32, are formed, the actuation timing of the output shaft 32 and the driving timing of the actuator 20 by the hydraulic pump 16 can be certainly synchronized to permit high speed operation of the tool changer 14. Furthermore, accuracy of actuation of the actuator 20 can be improved by avoiding delay of actuation timing of the actuator and failure in operation by the application of the cylinder device 70, to contribute for further high speed operation of the tool changer 14.

Also, the timing, at which the compensating hydraulic pressure is supplied to the piping 18 from the cylinder device 70, namely the timing for supplying the pneumatic pressure of the pneumatic pressure source 96 to the actuation pressure introducing chamber 76 may be arbitrarily determined upon occurrence of lowering of the hydraulic pressure within the fluid pressure circuit 12, or, in the alternative, can be regular timing synchronized with operation of the tool changer 14. While the foregoing embodiment has been disclosed in terms of application of the pressure loss compensation device 10 to the fluid pressure circuit 12 of the tool changer 14, the application of the present invention is not limited but can be applied for general fluid pressure circuit.

As set forth above, in the pressure loss compensator of the fluid pressure circuit according to the present invention, since the pressure loss of the fluid pressure in the fluid pressure circuit is compensated by the fluid pressure compensating device provided at the mid portion of the piping supplying the fluid pressure generated by the fluid pressure source, the working fluid pressure in the fluid pressure circuit can be constantly maintained at the necessary pressure to assure accurate operation of the actuator.

On the other hand, by constructing the fluid pressure compensation device with the cylinder device, an actuation pressure is supplied to the actuation pressure introducing chamber of the cylinder device to generate the fluid pressure within the fluid pressure generating chamber. Then, the fluid pressure in the fluid pressure generating chamber is supplied to the piping of the fluid pressure circuit via a branch circuit. Thus, the pressure loss caused in the fluid pressure circuit can be compensated. Accordingly, the constant fluid pressure can be always generated within the fluid pressure circuit to assure accurate operation of the actuator.

On the other hand, since the check valve is provided in the branch pipe, the fluid pressure once supplied within the fluid pressure circuit is prevented from surging into the fluid pressure generating chamber.

Furthermore, since the actuation pressure to be supplied to the actuation pressure introducing chamber is the pneumatic pressure, the piston can be pushed with damping effect as the air is compressive fluid to avoid abrupt variation of the fluid pressure generating chamber to smoothly compensate the fluid pressure in the fluid pressure circuit.

Also, since the return spring, providing the biasing force for the piston toward the actuation pressure introducing chamber, is provided, when supply of the actuation pressure to the actuation pressure introducing chamber is terminated, the piston is moved toward the actuation pressure introducing chamber by the return spring to make the fluid pressure generating chamber in vacuum condition. By this, the working fluid in the fluid reservoir can be introduced into the fluid pressure introducing chamber via the fluid induction pipe to certainly maintain the fluid pressure to be supplied in the fluid pressure circuit in the next time.

On the other hand, since the check valve is provided in the fluid induction pipe for permitting only flow of the fluid toward the fluid pressure generating chamber, the pressure generated in the fluid pressure generating chamber will not escape to the fluid reservoir via the fluid induction pipe.

When the fluid pressure in the fluid pressure generating chamber is supplied to the fluid pressure circuit for compensation, the excessive pressure developed in the fluid pressure circuit can be relieved through the relief pipe, the excessive pressure introducing port to the drain port. Thus, the fluid pressure in the fluid pressure circuit can be maintained constant.

Also, since the relief pipe is connected to the portion of the piping where the air is easily accumulated, the air accumulated in the piping can be discharged simultaneously with draining of the excessive fluid pressure through the relief pipe. Thus, the air to be admixed into the fluid in the fluid pressure circuit can be discharged to develop the predetermined pressure to assure accurate operation of the actuator.

On the other hand, in case of the cam arrangement provided with the pressure loss compensation device in the fluid pressure circuit according to the present invention, since the fluid pressure source is built-in the housing, the whole construction of the cam arrangement becomes compact.

Since the second cam driving the fluid pressure source is arranged on the common input shaft with the first cam driving the output shaft for synchronous rotation, motion timing of the output shaft and the driving timing of the actuator by the fluid pressure source can be certainly matched for enabling high speed operation of the cam arrangement.

Particularly, delay of actuation timing of the actuator and failure of operation can be prevented by the fluid pressure compensator to improve accuracy of operation in the actuator. Thus, further high speed operation of the device becomes possible.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

It should be noted that the present invention is applicable for a fluid pressure circuit for driving a cam arrangement employed in an automatic tool changer which has been disclosed in a commonly owned co-pending application for the invention entitled "Automatic Tool Changer" which has been filed with claiming priority on the basis of Japanese Patent Application No. Heisei 8-298953. The disclosure of the above-identified co-pending patent application will be herein incorporated by reference.

What is claimed is:

1. A pressure loss compensation device of a fluid pressure circuit comprising a fluid pressure source, an actuator and a piping, wherein (1) a fluid pressure in said fluid pressure circuit is generated by said fluid pressure source and supplied to said actuator via said piping and (2) a fluid pressure compensator compensating a pressure loss of the fluid pressure in said fluid pressure circuit is provided at a portion of said piping, said fluid pressure compensator comprising:

(a) a piston slidably disposed within a casing having a first end and a second end, (b) an actuation pressure introducing chamber provided at the first end of said casing, (c) a fluid pressure generating chamber provided at the second end of said casing, (d) a branch pipe connecting the second end of said casing to said piping, and (e) a check valve provided in said branch pipe for only permitting flow of a working fluid from said fluid pressure generating chamber to said piping.

2. A pressure loss compensation device of a fluid pressure circuit as set forth in claim 1, wherein the actuation pressure to be supplied into said actuation pressure introducing chamber is a pneumatic pressure.

3. A pressure loss compensation device of a fluid pressure circuit as set forth in claim 1, wherein a return spring applying a biasing force for biasing said piston toward said actuation pressure introducing chamber is provided, a fluid induction pipe communicated with a fluid reservoir is connected to said fluid pressure generating chamber, a check valve permitting only fluid flow toward said fluid pressure generating chamber is provided in said fluid induction pipe, an excessive pressure introducing port is provided in said casing for communication with a drain port when said piston is shifted toward said fluid pressure generating chamber, and said excessive pressure introducing port is connected to said piping via a relief pipe.

4. A pressure loss compensation device of a fluid pressure circuit as set forth in claim 3, wherein said excessive pressure introducing port is communicated with said drain port via a gap serving to provide an orifice effect, said gap being opened by shifting of said piston toward said fluid pressure generating chamber.

5. A pressure loss compensation device of a fluid pressure circuit as set forth in claim 3, wherein said relief pipe is connected to a portion of said piping, where an air is easily accumulated.

6. A pressure loss compensation device of a fluid pressure circuit, in which a fluid pressure generated by a fluid pressure source is supplied to an actuator via a piping, comprising:

a fluid pressure compensator disposed at a mid portion of said piping for compensating a pressure loss of a fluid pressure within said fluid pressure circuit, said fluid pressure compensator being constructed with a cylinder device which includes:

a piston slidably disposed within a casing;

an actuation pressure introducing chamber provided at one end of said casing and introducing an pneumatic pressure depressing said piston;

a fluid pressure generating chamber provided at the other end of said casing and communicated with said piping through a branch pipe;

a check valve provided in said branch pipe for permitting only flow of fluid from said fluid pressure generating chamber to said piping;

a return spring provided in said casing and providing a biasing force for biasing said piston toward said actuation pressure introducing chamber;

a fluid induction pipe connected to said fluid pressure generating chamber for communicating the latter to a fluid reservoir;

a check valve provided in said fluid induction pipe for permitting only flow of fluid toward said fluid pressure generating chamber;

an excessive pressure induction port provided in said casing and communicating with a drain port when said piston is shifted toward said fluid pressure generating chamber; and a relief pipe connecting between said excessive pressure introducing port and said piping.

7. A pressure loss compensation device of a fluid pressure circuit as set forth in claim 6, wherein said excessive pressure introducing port is communicated with said drain port via a gap serving to provide an orifice effect, said gap being opened by shifting of said piston toward said fluid pressure generating chamber.

8. A pressure loss compensation device of a fluid pressure circuit as set forth in claim 6, wherein said relief pipe is connected to a portion of said piping, where an air is easily accumulated.

9. A cam arrangement comprising:

a first cam rotatingly driven by an input shaft for outputting a motion to an output shaft, and a second cam arranged in parallel with said first cam on said input shaft in coaxial fashion;

a fluid pressure source driven by said second cam via a swing lever;

a fluid pressure circuit connected to said fluid pressure source for supplying a fluid pressure to an actuator through a piping; and a fluid pressure compensator provided at an intermediate position of said piping for compensating a pressure loss of the fluid pressure in said fluid pressure circuit, said fluid pressure compensator comprising:

(a) a piston slidably disposed within a casing having a first end and a second end, (b) an actuation pressure introducing chamber provided at the first end of said casing, (c) a fluid pressure generating chamber provided at the second end of said casing, (d) a branch pipe connecting the second end of said casing to said piping, and (e) a check valve provided in said branch pipe for only permitting flow of a working fluid from said fluid pressure generating chamber to said piping.

10. A cam arrangement comprising:

a first cam rotatingly driven by an input shaft for outputting a motion to an output shaft, and a second cam arranged in parallel with said first cam on said input shaft in coaxial fashion;

a fluid pressure source driven by said second cam via a swing lever;

a fluid pressure circuit connected to said fluid pressure source for supplying a fluid pressure to an actuator through piping;

a fluid pressure compensator provided at an intermediate position of said piping for compensating a pressure loss of the fluid pressure in said fluid pressure circuit, said fluid pressure compensator being constructed with a cylinder device which includes:

a piston slidably disposed within a casing;

an actuation pressure introducing chamber provided at one end of said casing and introducing a pneumatic pressure depressing said piston;

a fluid pressure generating chamber provided at the other end of said casing and communicated with said piping through a branch pipe;

a check valve provided in said branch pipe for permitting only flow of fluid from said fluid pressure generating chamber to said piping;

a return spring provided in said casing and providing a biasing force for biasing said piston toward said actuation pressure introducing chamber;

a fluid induction pipe connected to said fluid pressure generating chamber for communicating the latter to a fluid reservoir;

a check valve provided in said fluid induction pipe for permitting only flow of fluid toward said fluid pressure generating chamber;

an excessive pressure induction port provided in said casing and communicating with a drain port when said piston is shifted toward said fluid pressure generating chamber; and a relief pipe connecting between said excessive pressure introducing port and said piping.

11. A cam arrangement as set forth in claim 10, wherein said excessive pressure introducing port is communicated with said drain port via a gap serving to provide an orifice effect, said gap being opened by shifting of said piston toward said fluid pressure generating chamber.

12. A cam arrangement as set forth in claim 10, wherein said relief pipe is connected to a portion of said piping, where an air is easily accumulated.

* * * * *